F. M. HENRY.
COMBINED SECTIONAL TIRE AND WHEEL RIM.
APPLICATION FILED JAN. 11, 1911.
1,010,258.
Patented Nov. 28, 1911.
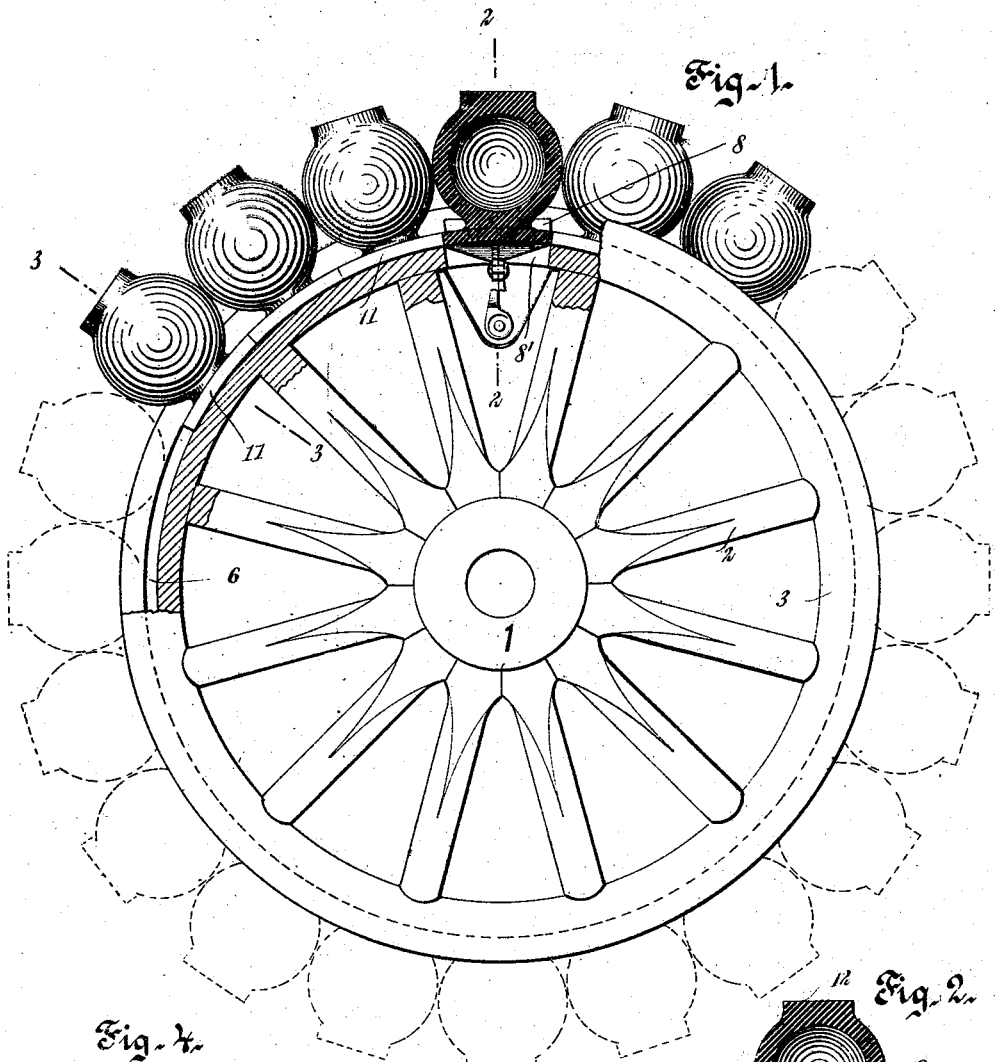
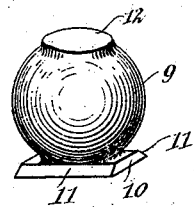
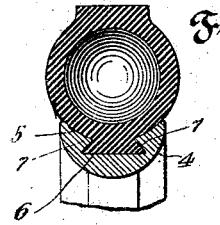
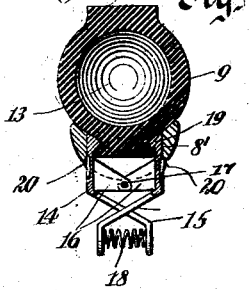
WITNESSES
INVENTOR
Frank M. Henry
BY
ATTORNEYS

UNITED STATES PATENT OFFICE.

FRANK M. HENRY, OF NEW YORK, N. Y.

COMBINED SECTIONAL TIRE AND WHEEL-RIM.

1,010,258.  Specification of Letters Patent.  Patented Nov. 28, 1911.

Application filed January 11, 1911. Serial No. 601,992.

*To all whom it may concern:*

Be it known that I, FRANK M. HENRY, a citizen of the United States, and a resident of the city of New York, borough of Brooklyn, in the county of Kings and State of New York, have invented a new and Improved Combined Sectional Tire and Wheel-Rim, of which the following is a full, clear, and exact description.

My invention comprises a sectional tire so constructed as to localize damage; in order that when any part of the tire is cut or injured it can be removed and replaced without necessitating the substitution of a whole new tire.

It also comprises means whereby the sections of the tire are removably held in place on the rim of a wheel to which they are fitted for use.

Reference is to be had to the accompanying drawings forming a part of this specification, in which similar characters of reference indicate corresponding parts in all the views.

Figure 1 is a side view of a wheel with the sections of my improved tire in position; Fig. 2 is a cross-section taken on the line 2—2 of Fig. 1; Fig. 3 is a cross-section taken on the line 3—3 of Fig. 1; and Fig. 4 is a perspective view of one of the tire sections in the form which I prefer to employ.

On the drawings, 1 is the hub of a wheel, from which radiate spokes 2, connected at their outer ends to a rim 3. This rim has a convex inner surface 4, and a concave outer face 5. In the bottom of this concave outer face is an annular groove 6, which widens inward so as to form annular ribs 7, between the bottom of the groove 6 and the outer surface of the tire 5.

On the concave surface 5, the groove 6 extends around the outer circumference of the wheel rim 3, and at a point on the said circumference the ribs 7 are cut away for a short space, as shown at 8. At the same point an opening 8' is formed in the rim of the tire, this opening passing therethrough in a radial direction, the sides of this opening being perfectly smooth, and the width thereof measured in a direction transverse to the rim of the tire is equal to the bottom width of the groove 6. The ends of this opening are flush with the ends of the annular ribs 7, where they are cut away to permit the opening to be formed.

The sections of my tire are preferably ball-shaped, as shown on Fig. 4, and have integral oblong bases 10, the sides of which are beveled, as shown at 11. This bevel is formed to make the same angle with the bottom of the base 10 as is formed by the bottom and sides of the groove 6, so that the base 10 will fit snugly into this groove and hold the ball in place. At the outer end, on top of each ball 9, is a circular flat surface 12, this flat surface forming the tread of the tire. By means of this flat surface 12 I make the balls somewhat thicker on the outside so as to provide for wear, and at the same time the corners of this surface 12 serve to give the tire a better engagement with the ground and prevent the same from slipping or skidding. The balls may be made hollow so as to inclose an interior space 13, in which there is air, or they may be made solid, if desired. To put the balls in place, the bases 10 are inserted into the opening 8' in the rim of the tire until the bottom surfaces of the bases 10 lie flush with the bottom of the groove 6. The base of the ball is then pushed into the groove, and this base can be made to slide around in the groove until the ball reaches the point where it is to be held in place. The annular ribs 7 engaging the beveled sides 11 of the base 10 of the balls prevent the same from dropping out or being torn loose from their seat in the outer face of the rim.

In mounting the ball sections of the wheel I move the first ball around until it reaches a point diametrically opposite the opening 8'. The remaining balls are then inserted in succession and moved into the groove 6 from both ends of the opening 8', until each semi-circumference of the rim of the wheel contains all of the balls that it will hold. I then insert the last ball in place, and the mounting of the tire is completed, making the same ready for use.

In order to hold the last ball in position and prevent it either from falling out or from being pushed inward through the opening 8' in the rim of the wheel 3, I employ a suitable clip, for the details of which reference is had to Fig. 2. This clip is indicated by the numeral 14', and it consists of two pivotally-connected members 15, which are bent to cross each other, like the two parts of a pair of pincers. These members 15 have inwardly-extending lugs 16, which receive a pivot pin 17, on which the two members 15 turn. Between the outer ends of this clip is a spring 18, which is normally under compression and acts to force the opposite ends of the clip together. At the opposite ends of this clip each of the members 15 is formed with a transverse inner projection 19, which has the same cross-sectional size and shape as those of the annular ribs 7. On the outer sides of the members 15 below the projection 19 are two outwardly-extending leaf springs 19, 20, which engage the inner surface of the rim of the tire and prevent the clip from being pulled out of the opening 8'.

When all of the sections of the tire have been inserted but one, this last section is connected to the clip 14 by causing the projections thereof to engage the beveled sides 11 of this ball section. The clip is then pushed in through the opening 8', and as it passes therethrough the springs 20 are forced together by the flat sides 8 of the aperture 8' formed by cutting away the ribs 7. As soon as the spherical surface of the ball contacts with the concave outer surface of the tire rim, the springs 20 will have passed through the opening and will fly outward from the effect of their own resiliency. The result will be that the springs 20 will engage the inner convex surface of the tire of the wheel rim 4, adjacent the opening 8', and prevent the last ball from falling out.

The diameter of the balls is preferably slightly greater than the width of the rim of the wheel, as is the usual practice, and this feature will prevent the ball engaged by the clip 14 from being forced inward through the opening 8' without necessitating the presence of any device for preventing the clip 14 from being pushed inward through the opening 8' too far.

Should one of the ball sections of the tire ever be cut or otherwise damaged, this ball can readily be removed by pressing together the inner ends of the clip 15 and removing the ball attached thereto so as to clear the opening 8'. The balls between the opening 8' and the damaged section are then removed so that the section which is damaged can be pulled along the groove 6 until it reaches the opening 8', through which it can be removed. The other balls are then replaced and an additional new ball added, and the last ball put in position by means of the clip 14, as in the first instance.

Obviously, I may make such changes in the shape and size of the parts as clearly come within the scope of my invention.

Having thus described my invention, I claim as new and desire to secure by Letters Patent:

1. A tire section comprising a spherical body, a base secured to said body, and a projection formed on the opposite side of said body and having a flat surface forming a tread for the tire section.

2. In a device of the class described, the combination of a wheel rim, a circumferential groove in the outer face of the rim, said groove widening inward, an opening passing through the rim, said opening being of uniform width, and the width of said opening being equal to the maximum width of the groove in the rim, the ends of said groove communicating with the sides of said opening, and fastening means fitting within the said opening, said fastening means having transverse inwardly-extending projections to form a continuation of the sides of the groove across said opening, and having means for engaging the rim to prevent the fastening means from being drawn outward through the opening, said engaging means being disengageable to permit the fastening means to be drawn outward through the opening when occasion requires.

3. In a device of the class described, the combination of a wheel rim, a circumferential groove in the outer face of the rim, said groove widening inward, tire sections having bases received by said groove, a radial opening through said rim, said opening being of uniform width and having its width equal to the maximum width of the groove in the rim, fastening means passing into said opening and having transverse projections forming a continuation of the sides of the groove across said opening, and means engaging the inner surface of the rim to prevent the fastening means from being drawn outward through said opening, one of said tire sections being mounted on the rim opposite the opening, and having its base engaged by the transverse projections of the fastening means, to hold the same in place, said engaging means on the fastening means being disengageable from the rim of the wheel to permit the section mounted on the rim adjacent the opening, and the fastening means attached thereto, to be removed from the rim, whereby any number of the other tire sections may then be removed by slipping them one by one along the groove until they reach the said opening.

In testimony whereof I have signed my name to this specification in the presence of two subscribing witnesses.

FRANK M. HENRY.

Witnesses:
 Geo. Delcher,
 W. W. Delcher.